(12) United States Patent
Schiller

(10) Patent No.: US 8,376,755 B2
(45) Date of Patent: Feb. 19, 2013

(54) SYSTEM FOR THE NORMALIZATION OF SCHOOL PERFORMANCE STATISTICS

(75) Inventor: Andrew Schiller, Worcester, MA (US)

(73) Assignee: Location Inc. Group Corporation, Worcester, MA (US)

(*) Notice: Subject to any disclaimer, the term of this patent is extended or adjusted under 35 U.S.C. 154(b) by 903 days.

(21) Appl. No.: 12/437,828

(22) Filed: May 8, 2009

(65) Prior Publication Data

US 2009/0280465 A1 Nov. 12, 2009

Related U.S. Application Data

(60) Provisional application No. 61/051,797, filed on May 9, 2008.

(51) Int. Cl.
*G09B 25/00* (2006.01)

(52) U.S. Cl. ......... 434/365; 434/322; 434/323; 434/350

(58) Field of Classification Search .................. 434/322, 434/323, 350, 365, 336, 353
See application file for complete search history.

(56) References Cited

U.S. PATENT DOCUMENTS

| | | |
|---|---|---|
| 6,183,261 B1 | 2/2001 | Clark et al. |
| 6,419,496 B1 | 7/2002 | Vaughan, Jr. |
| 6,464,505 B1 | 10/2002 | Pocock |
| 6,688,889 B2 | 2/2004 | Wallace et al. |
| 6,782,396 B2 | 8/2004 | Greene et al. |
| 7,103,508 B2 | 9/2006 | Fujimori et al. |
| 7,165,012 B2 | 1/2007 | Swanson |
| 7,266,340 B2 | 9/2007 | Bresciani |
| 2003/0180703 A1 | 9/2003 | Yates et al. |
| 2004/0110119 A1* | 6/2004 | Riconda et al. ............... 434/350 |
| 2005/0026131 A1 | 2/2005 | Elzinga et al. |
| 2005/0048458 A1 | 3/2005 | Collins et al. |
| 2005/0196742 A1* | 9/2005 | Harber et al. .................. 434/362 |
| 2006/0040247 A1 | 2/2006 | Templin |
| 2006/0078863 A1 | 4/2006 | Coleman et al. |
| 2006/0084048 A1 | 4/2006 | Sanford et al. |
| 2006/0112145 A1* | 5/2006 | Rieger et al. .................. 707/200 |
| 2007/0099169 A1 | 5/2007 | Beamish et al. |
| 2007/0111190 A1* | 5/2007 | Cohen et al. .................. 434/350 |
| 2008/0133476 A1* | 6/2008 | Welch .............................. 707/3 |
| 2008/0189632 A1* | 8/2008 | Tien et al. ...................... 715/764 |
| 2008/0213739 A1* | 9/2008 | Stern et al. .................... 434/322 |
| 2008/0228747 A1* | 9/2008 | Thrall et al. ...................... 707/5 |
| 2009/0081629 A1* | 3/2009 | Billmyer et al. .............. 434/362 |
| 2009/0162826 A1* | 6/2009 | Ayati et al. .................... 434/323 |
| 2009/0170058 A1* | 7/2009 | Walker et al. ................. 434/323 |

* cited by examiner

OTHER PUBLICATIONS

Selwyn, Neil, "Students' attitudes toward computers: Validation of a computer attitude scale for 16-19 education," Computers and Education, Jan. 1997, vol. 28, Issue 1, p. 35-41; Engineering Village, 2008 Elsevier Inc.

*Primary Examiner* — Xuan Thai
*Assistant Examiner* — Bruk Gebremichael
(74) *Attorney, Agent, or Firm* — Sean D. Detweiler, Esq.; Morse, Barnes-Brown & Pendleton, P.C.

(57) ABSTRACT

A method and system is provided to directly compare school districts and individual schools across state lines, and the geographic areas served by those schools (counties, municipalities, zip codes, neighborhoods) based on their reported standardized test scores despite the fact that each state has prepared their own version of standardized tests to benchmark the performance of their students. While standardized tests, such as the No Child Left Behind (NCLB) test, can provide a meaningful comparison between any students and schools that were administered the same test, since the tests are different state-to-state a comparison on this basis is generally inaccurate and unreliable. To normalize the local standardized test results based on the differences in tests in different localities, an additional factor is employed as a modifier of the NCLB test results resulting in a normalized comparison.

22 Claims, 2 Drawing Sheets

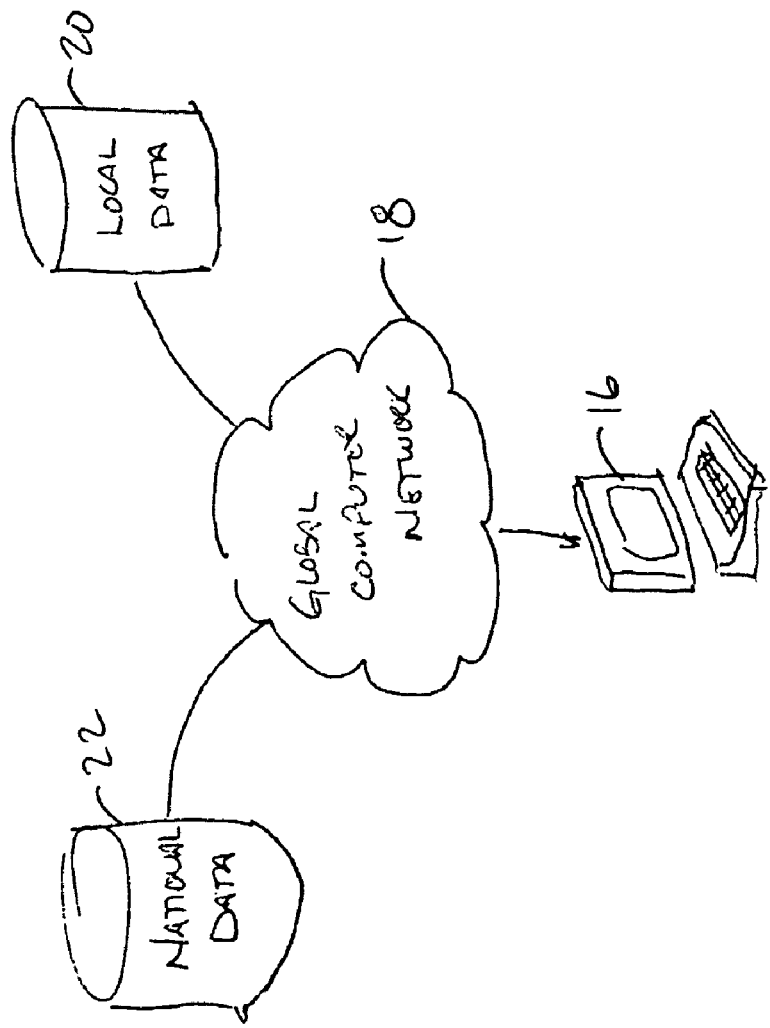

SYSTEM FOR THE NORMALIZATION OF SCHOOL PERFORMANCE STATISTICS

CROSS-REFERENCE TO RELATED APPLICATIONS

This application is related to and claims priority from earlier filed U.S. Provisional Patent Application No. 61/051,797, filed May 9, 2008.

BACKGROUND OF THE INVENTION

The present invention relates generally to a method and system for normalizing school performance data. More specifically, the present invention relates to a method and system for normalizing local school performance data relative to the performance data obtained from various schools and school districts across the country so as to allow meaningful, statistically relevant and direct comparison therebetween.

It is well known that the quality of education provided by public schools varies greatly depending on your location in the country. It is also well known that the quality of a child's education can vary significantly from school district to school district within a state and or even between two different schools within the same school district. In recognition of the wide variation in educational standards, an attempt to quantify student performance and to improve the performance of elementary and secondary schools across America was adopted in the context of the No Child Left Behind (NCLB) Act, which was signed into law in January of 2002. The NCLB has earmarked billions of dollars that are directed to nationwide educational reform and improvement. Under NCLB each state receives federal dollars for its public and charter schools based on the performance of their schools. One of the main mechanisms for assessing performance is through student testing and the resulting test scores. In response, schools have started placing far more of an emphasis on preparing students for these NCLB standardized tests.

While theoretically, the concept of a national NCLB standardized test should provide a milestone by which to compare the performance of all of the schools in the country relative to one another, the actual test is not truly standardized. This is because while the federal government passed down guidelines and standards for the creation of a testing mechanism, the states themselves were left to develop, implement and administer the actual NCLB tests. One can easily appreciate that since the federal education grants provided to a state are based on the state's performance on the NCLB tests and since the states are then charged with authoring and administering their NCLB test, there is an incentive to create a system that skews the results in order to obtain higher grant awards. The ultimate result was that many states made their job easier by simply setting their own bar lower. A race to the bottom ensued where every state declared that its kids were better than average based on their test results. Take the amazing case of Mississippi, where according to the standards it set for itself, 89% of its fourth-graders were proficient or better in reading, making them the best in the nation. Yet according to the random sampling done every few years by the National Assessment of Educational Progress (NAEP) test, a mere 18% of the state's fourth-graders were proficient, making them the worst in the nation. As a result, despite the federal guidelines and standards, there is still a wide variation in the difficulty and content of the actual tests that have been implemented from state to state. Therefore, any national or interstate school comparison system that employs strictly the NCLB results as a basis for comparison is likely skewed due to the widespread differences in the underlying tests.

In the prior art, there are patent references such as U.S. Pat. No. 7,266,340 (Brescaini) that discuss the provision of a system for the normalization of student performance assessments. Brescaini provides an evaluative framework wherein student assessments are entered, evaluated and structured in a manner that normalizes the assessments in order to allow an objective side-by-side comparison of the assessments. While the Brescaini reference refers to their process as normalization, it appears that a better term would be standardization in that the Brescaini system provides a framework that limits the possible range of evaluative responses. This standardized structure thereby forces those entering the assessments to reframe their responses in a manner that fits within the system. Accordingly, while Brescaini acknowledges that there is a need for a comprehensive system that allows for inter-jurisdictional comparison of student performance assessments, Brescaini does not disclose a normalization process by which this can be accomplished. The only way Brescaini could achieve the goal of inter-jurisdictional comparison would be by mandating that every school district in the country conform to their single system. Therefore, Brescaini does not teach a method of taking student test scores from different base tests and normalizing the test scores across the different tests to make the results comparable.

Similarly, U.S. Pat. No. 6,183,261 (Clark et al.) provides for a collaborative scoring system to reduce scoring errors and normalize test answers relative to one another. In Clark, a system is provided wherein the answers entered during a test are simultaneously scored by at least two people. If there is a discrepancy in their scoring, the answer is flagged for further scrutiny thereby reducing errors in scoring. In this regard, Clark provides for the concept of normalization across test scoring but it is employed on an answer-by-answer basis in connection with the scoring of a single test for each individual student. In no way does Clark et al.'s system provide for a structure that allows comparison between test results from different test-takers and different base tests, as Clark et al. only insures that incorrect scoring on any one answer on a given standardized test is reduced to a minimum by having two people evaluate that individual student's score.

There is therefore a need for a method and system that provides normalization of student testing data and results that facilitates a true comparison of all of the various schools and school districts across the nation such that test scores can be compared meaningfully even when the test-takers are taking different tests. Further, there is a need for a method and system that provides a meaningful basis for comparison of school performance statistics on a national basis, particularly across or between schools in different states.

BRIEF SUMMARY OF THE INVENTION

In this regard, the present invention provides a method and system that employs a normalization factor to facilitate meaningful comparison of student results on various benchmark performance tests. In one embodiment, the present invention provides a method and system that employs a normalization factor for the NCLB state-specific testing scores such that they provide a meaningful basis of comparison between schools regardless of the school's geographic location or the relative difficulty of the NCLB tests that a given state has developed.

As was stated above, each state has prepared their own version of standardized tests to benchmark the performance of their students. For example, all of the states in the US have developed their own version of a standardized test in order to implement the mandates under NCLB. The present invention provides a method and system to directly compare both individual schools and school districts across state lines based on their reported state-specific standardized test scores, even though these standardized tests are entirely different in each state.

Generally, the present invention operates on the basis that all students attending public elementary and secondary schools must take standardized tests to determine student performance criteria. For example, the NCLB standardized test is offered within each state and provides a publicly available data repository for student performance within each of those schools as every student enrolled in public schools must, in certain grades, take the NCLB tests for their state. While the NCLB test results can provide a meaningful comparison between any students and schools that were administered the same test, since the tests are different state-to-state a comparison on this basis is generally inaccurate and unreliable. To normalize the NCLB test results based on the differences the present invention employs an additional factor as a modifier of the each school's and school district's NCLB test results.

In addition to the NCLB testing, a population of randomly selected students in each state also takes various other standardized tests such as, for example, the National Assessment of Educational Progress (NAEP) test. The NAEP test is the closest thing to a gold standard national test and it is administered in the same form to every student who takes the test. In fact, the NAEP test is the basis for the U.S. Department of Education's "Nation's Report Card," used to compare each state by how their students do on this standardized test, but the NAEP is not used to compare how individual schools or school districts compare with schools and school districts in different states. The difficulty in using this test as a basis for comparison of individual schools or school districts on its own is that there are not enough students in any one school or school district that take the test to make it statistically significant for comparison within smaller populations. It is of importance, however, that although the NAEP is the same in every location the results reported by the NAEP for each state often differ significantly from the NCLB results for any given state, as reported in Time Magazine. For example, the average percentage of students who passed the NAEP recently in Mississippi was 16% while in Massachusetts the pass rate was 45%, even though the test that was administered was identical in both locations. In contrast, Mississippi's recent state-specific NCLB testing scores show that nearly 75% of their students across all tested grades are proficient or advanced, making it look like Mississippi has an outstanding school system. The reality however is that Mississippi's NCLB scores are high because their NCLB test is built to be easier than the Massachusetts NCLB test, whose recent state-wide proficiency rate on its own NCLB test was under 60%, and much closer to the passing rate for the NAEP administered to a sampling of Massachusetts school children.

As a result, neither of the available tests provides an ideal set of data for the comparison of individual schools or school districts on a nation wide basis. The NCLB is often skewed because of local test development bias and the NEAP, while comparable and without local bias, is not administered on a widespread enough basis to develop a statistically significant sample for individual schools and school districts. In accordance with the present invention, a method and system has been developed to make each state's NCLB test scores for every school and school district in that state, directly comparable to other schools and school districts in different states.

In operation, the system takes the percentage of students in each state testing as proficient in reading and math on the state-specific NCLB test, and the percentage of students in that state who passed the NAEP, either in total or for these specific subjects, and subtracts the former from the latter. This subtraction produces a state-specific gap value. This state-specific gap value quantifies the difference between that state's NCLB test results and that state's NAEP test results. This state-specific gap value is then added to each school and school districts NCLB proficiency percentages for each of the individual schools and school districts in that state, producing an adjusted school-specific score. Once the school-specific and school district-specific NCLB results are adjusted, all schools are ranked and all school districts are ranked relative to one another nationwide. As a result, the method and system of the present invention provides a curve that brings all districts (and each of the schools within those districts) to a nationally comparable rating based on the NCLB testing results.

It is therefore an object of the present invention to provide a method and system that provides normalization of student testing data and results that facilitate a true comparison of all of the various schools and school districts across the nation by normalizing the state-specific test results to a national standard. It is a further object of the present invention to provide a method and system that provides a meaningful basis for comparison of school performance statistics on a national basis.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 2 is a system for implementing the method depicted in FIG. 1.

DETAILED DESCRIPTION OF THE INVENTION

Figure 1:
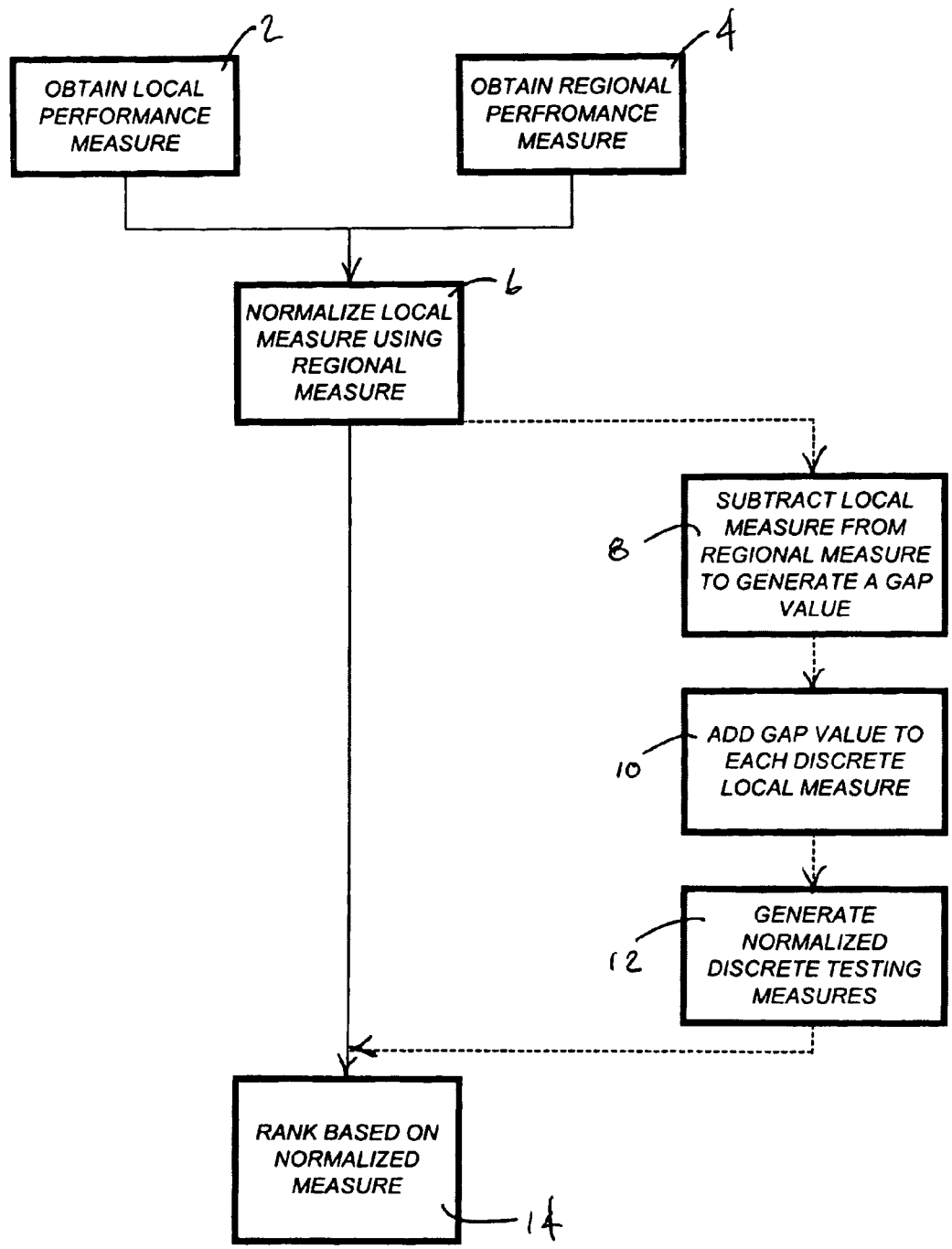
FIG. 1 is a flow chart depicting the method for normalizing school performance statistics in accordance with the teachings of the present invention.

Now referring to the drawings, the method and system of the present invention is shown and generally illustrated in the figures. As can be seen the present invention provides a method and system that employs a normalization factor to facilitate meaningful comparison of student results on various benchmark performance tests.

It is of note that the data used in developing the school rankings and ratings in the method and system of the present invention are obtained from readily available records including the NCLB test scores from each state's Department of Education and the National Assessment of Educational Progress from the NAEP data, found within the National Center for Education Statistics of the U.S. Department of Education. In addition to the mathematical analysis performed in connection with the method and system disclosed herein, additional details on educational environment, school enrollment, ethnicity/ancestry of the school population, socioeconomic group and school funding all may be employed using weighting factors to further enhance the accuracy and reliability of the nationally comparable school rankings.

Further, while a specific implementation has been described herein for the purpose of illustrating and providing context for the present invention, one skilled in the art can appreciate that the method and system of the present invention is applicable to any method and system that falls within the general guidelines set forth herein and would therefore still fall within the spirit of the present invention. In particular, while currently the present invention states that it employs the NCLB and NEAP testing results to create a national school ranking system, the scope of the present invention is not limited to these specific tests or test formats. The intent and scope of the present invention covers the use of a standardized nationwide test as a scaling factor to effectively normalize the results obtained in local testing results in order to facilitate a meaningful regional and/or nationwide comparison of individual schools and school districts, regardless of the specific tests that may be used.

In one illustrative embodiment, the present invention provides a method that employs a normalization factor for the local NCLB state standardized testing scores such that they provide a meaningful basis of comparison between schools regardless of the school's geographic location or the relative difficulty of the NCLB tests that a given state has developed and administers to its students.

Generally, the present invention operates on the basis that all students attending public elementary and secondary schools must take standardized tests to determine student performance criteria. For example, the NCLB standardized test or any other locally prepared and administered performance assessment test is offered within each state and provides a publicly available data repository for student performance within each of those schools. While these test results can provide a meaningful comparison between any students and schools that were administered the same test, since the tests are different state-to-state a comparison on this basis is generally inaccurate and unreliable. To normalize the test results based on the differences the present invention employs an additional factor that is employed as a modifier of the locally administered test results.

It is common practice that in addition to locally administered testing, a population of randomly selected students in each state also takes various other nationally prepared and administered standardized tests such as, for example, the National Assessment of Educational Progress (NAEP) test. The difficulty in using this test as a basis for comparison on its own is that there are not enough students in any one school or school district that take the test to make it statistically significant for comparison within smaller populations. It is of note, however, that although the NAEP is the same in every location the results reported by the NAEP often differ significantly from the NCLB results for any given state. For example, the average percentage of students who passed the NAEP recently in Mississippi was 16% while in Massachusetts the pass rate was 45%, even though the test that was administered was identical in both locations. In contrast, Mississippi's recent NCLB testing scores show that nearly 75% of their students are proficient or advanced, making it look like Mississippi has an outstanding school system. The reality however is that Mississippi's NCLB scores are high because their NCLB test is built to be easier than the Massachusetts NCLB test.

As a result, neither of the available tests provides an ideal set of data for the comparison of schools on a nation wide district-by-district basis. The NCLB is often skewed because of local test development bias and the NEAP is not administered on a widespread enough basis to develop a statistically significant sample. In accordance with the present invention, a method and system has been developed to make each state's NCLB test scores for every district comparable to other school districts in different states.

Turning to FIG. 1, in operation, the system obtains a local performance measure for a locality (step 2) such as for example the average percentage of students in the locality testing as proficient in reading and math on the locally administered test, such as the NCLB state-specific test. The system then obtains a national performance measure for the locality (step 4) such as the percentage of students in that state who passed a nationally prepared and administered test, such as the NAEP. Further, while national performance measure is indicated here in the form of the NAEP, the intent is that a regional measure that is larger than individual schools be employed. In this regard, national and regional are intended to be interchangeable for the purpose of this disclosure. The national performance measure obtained in step 4 is then used in a normalization step 6 to normalize the local performance measure for each of the schools and/or school districts in the locality. In the normalization step 6, the local performance measure obtained in step 2 is subtracted (step 8) from the national performance measure obtained in step 4. This step 8 of subtracting or adjusting the local measure obtained in step 2 from the national measure obtained in step 4 may be done using the aggregate scores or on a subject-by-subject basis. This adjustment of step 8 produces a gap value that is then added to the local measure for each of the individual schools (step 10) and school districts in that state to provide a normalized local testing result (step 12). Once the normalized local testing results have been developed, all of the schools are ranked and all of the school districts are ranked relative to one another nationwide (step 14). As a result, the method and system of the present invention provides a curve that brings all districts (and schools within those districts) to a nationally comparable rating based on their locally developed and administered testing results. After being normalized, these normalized rankings for school districts are also applied to geographic locations, such as neighborhoods and towns served by the school districts, to assign town-specific and neighborhood-specific school quality ratings for use and research by people looking to target an area for buying a home that has been rated on a nationally comparable scale based on school district quality, and educational environment of the geographic location.

In a specific example, we can follow the mathematics of the method of the present invention in the context of the state of Massachusetts. In 2007, the results of their NCLB testing produced a math proficiency score of 52.9% and a reading proficiency score of 65.8% yielding a NCLB overall proficiency for Massachusetts of 59.4%. For the same 2007 year, the Massachusetts proficiency rate achieved on the nationally administered NAEP test was 50.1%. In subtracting the NCLB proficiency of 59.4% from the NAEP proficiency of 50.1% we produce a gap value of −9.3%. This gap value can then be used to adjust the performance of each and every school and school district within Massachusetts to produce a truly nationally comparable testing result. In this case, the NCLB scores of each school and/or school district is adjusted by adding the gap value of (−9.3%) to the NCLB value. At Andover High School for example, their NCLB result of 92.5% is adjusted by adding −9.3% to reach an adjusted NCLB score of 83.2%. At a high school in Minnesota, the same local NCLB result of 92.5% is adjusted by adding −21.4%, the gap value calculated for Minnesota, to reach an adjusted NCLB score of 71.1%. As can be seen based only on the NCLB results these two schools appear the same however, clearly when adjusted and ranked nationally, Andover High School ranks higher than a Minnesota school with the same NCLB results. These adjusted NCLB scores are then used to rank order every single school and assign a percentile value ranking the school relative to all other schools in the country.

Also be noted that in all cases, the gap score is added to the base NCLB score. The step of addition is important in that it accounts for cases wherein the NCLB tests are both easier and harder than the NAEP tests. In a case where the NCLB is harder than the NEAP, the gap value would actually be positive and the NCLB test results would in turn be modified upwardly by the addition of a positive gap value.

In terms of a system, FIG. 2 depicts a processor 16 that is provided and is connected to a global computer network 18. The global computer network 18 also includes databases 20, 22 in communication therewith wherein the databases 20, 22 contain testing score results relating to both the locally developed and administered performance assessment tests and the nationally developed and administered performance assessment tests. Such local and national results may reside on the same database or on a plurality of different databases. Further, the information on the databases may be organized based on state, county, school district, municipality, zip code, neighborhood, other geographic area and/or individual school. The processor 16 performs a calculation, as disclosed above with respect to FIG. 1, whereby the average percentage of students testing as proficient in reading and math on the locally administered test, such as the NCLB state-specific test is subtracted from the percentage of students in that state who passed a nationally prepared and administered test, such as the NAEP. This step of subtracting the local pass rate from the national proficiency rate may be done using the aggregate scores or on a subject-by-subject basis (e.g., math, reading, writing, science, and so forth). By performing the subtraction, the processor produces a gap value that is then added to the local testing proficiency percentages for each of the individual schools and school districts in that state to provide a modified local testing result. Once the processor generates the modified local testing results, the processor ranks all of the schools and the school districts relative to one another nationwide, as well as all of the municipalities and neighborhoods relative to one another nationwide, and creates a report or a display of the relative rankings. As a result, the system of the present invention provides a curve that brings all districts (and schools within those districts) to a nationally comparable rating based on their locally developed and administered testing results.

It can therefore be seen that the present invention provides a method and system for the normalization of student testing data and results that facilitates a true comparison of all of the various schools and school districts across the nation. For these reasons, the current invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A computer-implemented method for normalizing local measures of performance to provide a basis for comparison, said method comprising:
   for each school or school district of a plurality of schools or school districts in a locality, obtaining, using at least one processor, a first measure of performance for that school or school district, whereby a plurality of first measures of performance are obtained, said plurality of first measures of performance being based on a locally generated performance test;
   generating, using at least one processor, a normalization factor based on a second measure of performance for said locality, said second measure of performance being based on a regionally generated performance test for a region that includes said locality; and
   for each school or school district of said plurality of schools or school districts, applying, using at least one processor, said normalization factor to said first measure of performance for that school or school district, thereby generating a plurality of normalized measures of performance for said plurality of schools or school districts;
   wherein said step of generating said normalization factor comprises obtaining, using at least one processor, said second measure of performance for said locality, and generating, using at least one processor, a gap value by subtracting said first measure of performance from said second measure of performance for said locality; and
   wherein for each school or school district of said plurality of schools or school districts said step of applying said normalization factor to said first measure of performance for that school or school district comprises adding, using at least one processor, said gap value to said first measure of performance for that school or school district.

2. The method of claim 1, further comprising generating, using at least one processor, a region-wide ranking of said plurality of schools or school districts based on said plurality of normalized measures of performance.

3. The method of claim 1, wherein said plurality of schools or school districts are a list of schools on a state-by-state basis, a district-by-district basis, or a school-by-school basis.

4. The method of claim 1, wherein said locally generated performance test comprises a test that is locally prepared and administered in said locality.

5. The method of claim 1, wherein said locality is a state and further wherein said locally generated performance test is a No Child Left Behind test for said locality.

6. The method of claim 1, wherein said regionally generated performance test comprises a nationally prepared and administered test.

7. The method of claim 1, wherein said region is a country and said regionally generated performance test is the National Assessment of Educational Progress test.

8. The method of claim 2, further comprising using said region-wide ranking of said plurality of schools or school districts to generate, using at least one processor, a region-wide ranking of a plurality of geographic locations served by said plurality of schools or school districts in such a way as to create a nationally comparable scale.

9. A computer-implemented method, comprising:
   for each school or school district of a plurality of schools or school districts in a locality, obtaining, using at least one processor, a first measure of performance for that school or school district, whereby a plurality of first measures of performance are obtained, said plurality of first measures of performance being based on a first performance test generated by and administered in said locality;

obtaining, using at least one processor, a second measure of performance for said locality, said second measure of performance being based on a second performance test generated for and administered across a region that includes said locality and one or more additional localities;

generating a gap value for said locality by subtracting, using at least one processor, said first measure of performance for said locality from said second measure of performance for said locality;

adding, using at least one processor, said gap value to each of said plurality of first measures of performance to generate a plurality of normalized measures of performance for said plurality of schools or school districts; and ranking, using at least one processor, each of said plurality of schools or school districts based on said plurality of normalized measures of performance.

10. The method of claim 9, wherein said plurality of schools or school districts are a list of schools on a state-by-state basis, a list of schools on a district-by-district basis, or a list of schools on a school-by-school basis.

11. The method of claim 9, further comprising:

for each additional school or school district of a plurality of additional schools or school districts in an additional locality of the one or more additional localities, obtaining, using at least one processor, a first measure of performance for that additional school or school district, whereby an additional plurality of first measures of performance are obtained, said additional plurality of first measures of performance being based on a third performance test generated by and administered in said additional locality;

generating, using at least one processor, an additional normalization factor based on a second measure of performance for said additional locality, said second measure of performance for said additional locality being based on said second performance test generated for and administered across said region; and for each additional school or school district of said plurality of additional schools or school districts, applying, using at least one processor, said additional normalization factor to said first measure of performance for that additional school or school district, thereby generating an additional plurality of normalized measures of performance for said plurality of additional schools or school districts.

12. The method of claim 11, wherein said step of ranking each of said plurality of schools or school districts further comprises ranking, using at least one processor, said plurality of additional schools or school districts, wherein said plurality of schools or school districts and said plurality of additional schools or school districts are ranked relative to one another.

13. The method of claim 9, further wherein said first performance test is locally prepared and administered in said locality.

14. The method of claim 9, wherein said locality is a state and further wherein said first performance test is a No Child Left Behind test for said locality.

15. The method of claim 9, wherein said region is a country.

16. The method of claim 9, wherein said region is a country and said second performance test is a National Assessment of Educational Progress test.

17. A system for normalizing local measures of performance to provide a basis for comparison, said system comprising:

a global computer network;

a first database containing a plurality of first measures of performance, each of the plurality of first measures of performance being for one of a plurality of schools or school districts in a locality, said plurality of first measures of performance being based on a locally generated performance test, said first database being in communication with said global computer network;

a second database containing a second measure of performance for said locality, said second measure of performance being based on a regionally generated performance test for a region that includes said locality, said second database being in communication with said global computer network;

a processor in communication with said global computer network, said processor generating a normalization factor for said locality based on said second measure of performance for said locality, applying said normalization factor to each of said plurality of first measures of performance for said plurality of schools or school districts to generate a plurality of normalized measures of performance for said plurality of schools or school districts, and generating a region-wide ranking of each of said plurality of schools or school districts based on said plurality of first measures of performance for said plurality of schools or school districts;

wherein said normalization factor comprises a gap value for said locality, said gap value generated by said processor by subtracting said first measure of performance for said locality from said second measure of performance for said locality, and wherein said step of applying said normalization factor comprises adding said gap value to each of said plurality of first measures of performance to generate a plurality of normalized measures of performance for said plurality of schools or school districts.

18. The system of claim 17, further wherein said processor ranks a plurality of geographic locations served by said plurality of schools or school districts based on said step of ranking said plurality of schools or school districts, in such a way as to create a nationally comparable scale.

19. The method of claim 8, wherein said plurality of geographic locations comprises a plurality of zip codes, a plurality of towns, a plurality of counties, a plurality of municipalities, a plurality of states, or a plurality of neighborhoods.

20. The method of claim 9, further comprising, based on said step of ranking of said plurality of schools or school districts, generating, using at least one processor, a region-wide ranking of a plurality of geographic locations served by said plurality of schools or school districts in such a way as to create a nationally comparable scale.

21. The method of claim 20, wherein said plurality of geographic locations comprises a plurality of zip codes, a plurality of towns, a plurality of counties, a plurality of municipalities, a plurality of states, or a plurality of neighborhoods.

22. The system of claim 18, wherein said plurality of geographic locations comprises a plurality of zip codes, a plurality of towns, a plurality of counties, a plurality of municipalities, a plurality of states, or a plurality of neighborhoods.

* * * * *